United States Patent
Raab et al.

(10) Patent No.: US 7,296,979 B2
(45) Date of Patent: Nov. 20, 2007

(54) STABLE VACUUM MOUNTING PLATE ADAPTER

(75) Inventors: Simon Raab, Maitland, FL (US); Marc M. Barber, Deltona, FL (US)

(73) Assignee: Faro Technologies Inc., Lake Mary, FL (US)

( * ) Notice: Subject to any disclaimer, the term of this patent is extended or adjusted under 35 U.S.C. 154(b) by 0 days.

(21) Appl. No.: 10/369,385

(22) Filed: Feb. 19, 2003

(65) Prior Publication Data

US 2003/0161737 A1 Aug. 28, 2003

Related U.S. Application Data

(60) Provisional application No. 60/359,743, filed on Feb. 26, 2002, provisional application No. 60/409,160, filed on Sep. 9, 2002.

(51) Int. Cl.
*F04F 5/00* (2006.01)
*A45D 42/14* (2006.01)
*G01B 5/004* (2006.01)

(52) U.S. Cl. .................. 417/151; 417/313; 248/205.8; 248/362; 248/363; 33/503; 33/556

(58) Field of Classification Search ............... 417/313, 417/151; 248/362, 363, 205.8; 33/503, 33/556–559
See application file for complete search history.

(56) References Cited

U.S. PATENT DOCUMENTS

| | | | |
|---|---|---|---|
| 3,013,688 A * | 12/1961 | Luning | 215/376 |
| 3,120,216 A * | 2/1964 | Meinhardt | 211/69.6 |
| 3,524,614 A * | 8/1970 | Sorth | 248/131 |
| 4,941,635 A * | 7/1990 | Lan | 248/346.11 |
| 5,168,636 A * | 12/1992 | Golden | 33/564 |
| 5,681,022 A * | 10/1997 | Rankin | 248/363 |
| 5,685,513 A * | 11/1997 | Tsukushi | 248/363 |
| 5,956,857 A | 9/1999 | Raab | |
| 6,497,394 B1 * | 12/2002 | Dunchock | 248/205.8 |
| 6,554,241 B1 * | 4/2003 | Leshem | 248/362 |
| 6,935,036 B2 * | 8/2005 | Raab et al. | 33/503 |
| 7,032,321 B2 * | 4/2006 | Raab et al. | 33/503 |
| 2003/0071405 A1 * | 4/2003 | Miksovsky | 269/95 |

FOREIGN PATENT DOCUMENTS

| | | |
|---|---|---|
| DE | 39 24 078 A | 1/1991 |
| DE | 197 55 063 A | 6/1999 |
| EP | 0 316 261 A | 5/1989 |
| EP | 1 088 624 A | 4/2001 |
| EP | 1 116 554 A | 7/2001 |

OTHER PUBLICATIONS

International Search Report, PCT/US 03/04821, Jun. 18, 2003.

* cited by examiner

*Primary Examiner*—Charles G Freay
(74) *Attorney, Agent, or Firm*—Cantor Colburn LLP

(57) ABSTRACT

A vacuum support includes a vacuum plate having a top surface and a bottom surface, the vacuum plate having a mechanical stop extending from the bottom surface; an elastomeric seal extending along a periphery of the bottom surface, the vacuum plate and the elastomeric seal defining a vacuum space; and a vacuum source in communication with the vacuum space. Upon attaching the vacuum plate to a mounting surface by reducing pressure in the vacuum space, the stop is in engagement with the mounting surface.

20 Claims, 2 Drawing Sheets

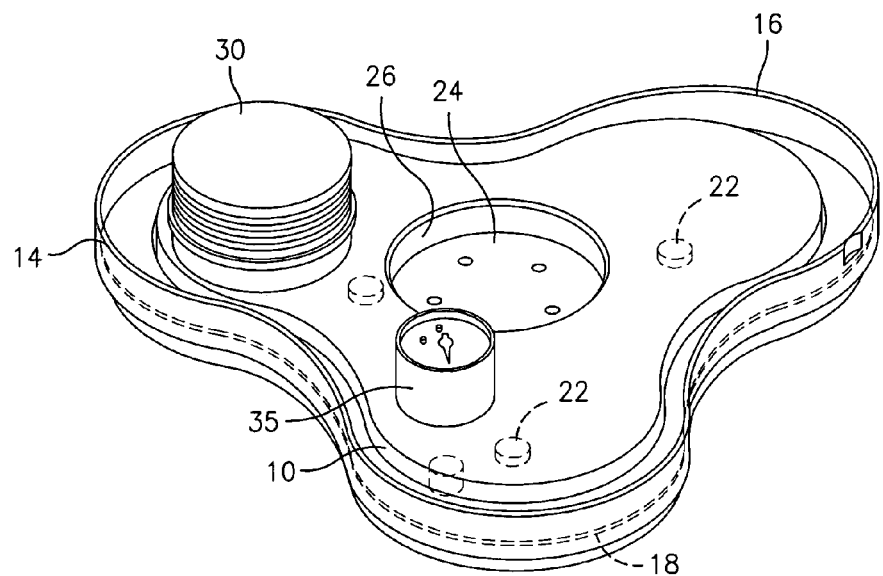
FIG. 1
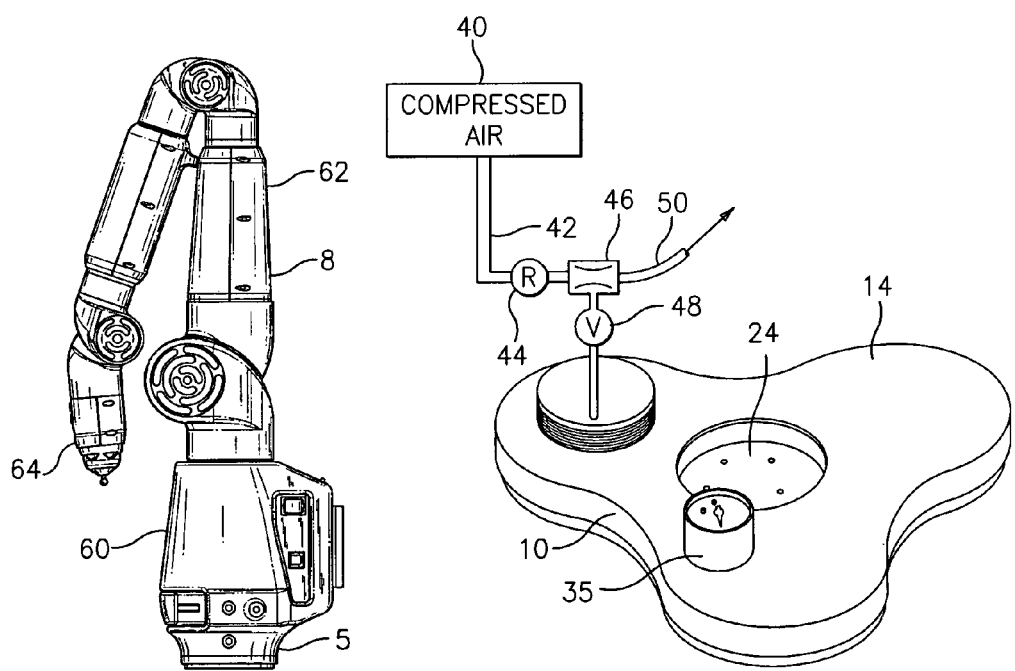
FIG. 3
FIG. 2

STABLE VACUUM MOUNTING PLATE ADAPTER

CROSS-REFERENCE TO RELATED APPLICATIONS

This application claims the benefit of U.S. provisional patent application Ser. No. 60/359,743 filed Feb. 26, 2002, the entire contents of which are incorporated herein by reference and claims the benefit of U.S. provisional patent application Ser. No. 60/409,160 filed Sep. 9, 2002, the entire contents of which are incorporated herein by reference.

TECHNICAL FIELD

This invention relates to stable supports. In particular, this invention relates to stable supports employing a vacuum.

BACKGROUND

There are many instances where a stable support is required to ensure that the object or device being supported remains fixed with respect to a table or other sturdy structure. For example, laboratory equipment and measurement equipment, such as a three-dimensional digitizer, are usually required to remain fixed with respect to a sturdy object or the floor.

One common method of ensuring stability of an apparatus has been physically bolting the apparatus to a table or floor. However, this method requires permanently altering the table or floor and makes repositioning difficult.

Another method of ensuring stability of an apparatus employs a high-strength magnet to fix the apparatus to a ferromagnetic surface, such as a steel table. This provides a strong sturdy support and is easily repositionable, but requires that a ferromagnetic surface be available.

SUMMARY

The above-discussed and other drawbacks and deficiencies of the prior art are overcome or alleviated by a vacuum support comprising a vacuum plate having a top surface and a bottom surface, the vacuum plate having a mechanical stop extending from the bottom surface; a seal extending along a periphery of the bottom surface, the vacuum plate and the seal defining a vacuum space; and a vacuum source in communication with the vacuum space. Upon attaching the vacuum plate to a mounting surface by reducing pressure in the vacuum space, the stop is in engagement with the mounting surface.

The above discussed and other features and advantages of the present invention will be appreciated and understood by those skilled in the art from the following detailed description and drawings representing the preferred embodiment.

BRIEF DESCRIPTION OF THE DRAWINGS

The present invention will now be described by way of example with reference to the accompanying drawings in which:

FIG. 1 shows a perspective view of a vacuum adapter;

FIG. 2 shows a perspective view of a vacuum adapter with a vacuum source illustrated schematically;

FIG. 3 shows an exemplary three-dimensional digitizer for use with the vacuum adapter;

DETAILED DESCRIPTION OF THE PREFERRED EMBODIMENT

Figure 4:
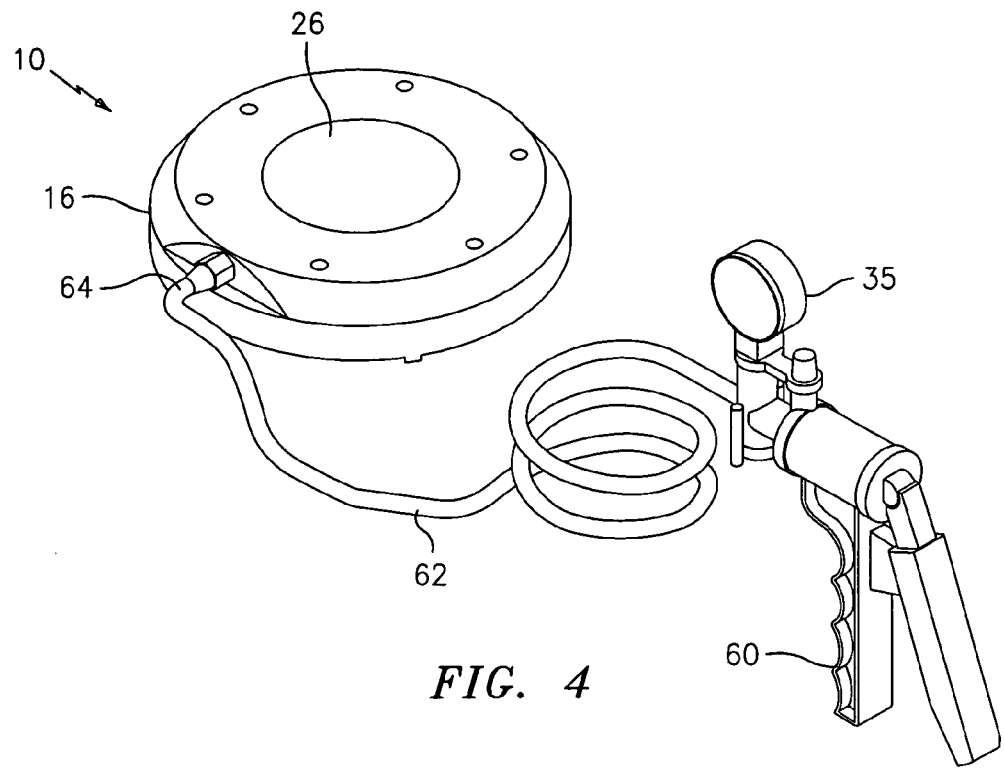
FIG. 4 shows an isometric view of another embodiment of a vacuum adapter.

An exemplary vacuum adapter 10 is shown at FIG. 1. This vacuum adapter comprises a high strength vacuum plate 16 having a plurality (e.g., at least three) mechanical solid stops or feet 22, and a seal 18 formed of rubber or synthetic elastomeric material. The seal 18 extends beyond the bottom of vacuum plate 16 to define a vacuum space beneath the bottom surface of the vacuum plate 16.

While relative dimensions and strengths of materials may vary depending upon the application, it is preferred that vacuum plate 16 comprise a high strength material. Aluminum is a preferred material for combining low weight, corrosion resistance, and strength. For example, vacuum plate 16 may include a 6061-T6 jig aluminum plate, which is a high tensile strength aluminum alloy used in the aerospace industry. While a cloverleaf configuration is shown, the shape is not critical. The vacuum plate 16 may be a round plate approximately eight inches (20.3 cm) in outside diameter with a vertical profile of one and a quarter inches (3.2 cm). Seal 18 is disposed in a groove formed in the bottom surface of vacuum plate 16. Vacuum plate 16 includes a recess underneath to increase the volume of space between vacuum plate 16 and the mounting surface. Furthermore, a hole is drilled through vacuum plate 16 and tapped for mounting vacuum gauge 35 (discussed in more detail below). The surface of vacuum plate 16 may be left as raw aluminum, or it may be covered by a plastic housing 14 formed of impact-resistant plastic attached via about four holes (not shown) drilled and tapped into vacuum plate 16 to accept mounting screws (not shown) securing the plastic housing. The plastic housing covers all vacuum components discussed in more detail below.

As a suction is applied between vacuum plate 16 and a solid non-permeable mounting surface (not shown), feet 22 provide stability to the vacuum plate 16 by preventing the plate from moving with respect to the surface as would be the case if seal 18 was relied upon to support vacuum plate 16. Steel plate 24, preferably a one-half inch thick (1.3 cm) SS416 steel alloy plate having a 3 inch (7.6 cm) diameter, is bolted or otherwise securely attached to vacuum plate 16. More preferably, the surface of steel plate 24 is ground and passivated to reduce oxidation. For example, steel plate 24 may be attached with bolts (not shown) extending into four holes drilled into vacuum plate 16 radially about the center thereof. Corresponding holes formed into steel plate 24 are tapped to accept the bolts. A recess 26, e.g., having a 3 inch (7.6 cm) diameter to accept steel plate 24 is formed in vacuum plate 16 to assist in centrally positioning the apparatus over steel plate 24. Recess 26 may be machined into the top surface of vacuum plate 16 or other means may be employed. A vacuum gauge 35 provides visual indication of the status of the vacuum between vacuum plate 16 and the surface to which adapter 10 is mounted.

A number of methods may be used for generating the vacuum. First, a pump 30, such as hand pump or electrically motorized pump may be provided. Such hand pumps and motorized pumps are generally known in the art and are generally available. The vacuum plate 16 includes an internal path so that the pump 30 is in fluid communication with the vacuum space beneath the vacuum plate 16.

In a second embodiment, a source of compressed air is applied through a venturi, which is then used to draw a vacuum from the vacuum space below the vacuum plate 16. For example, FIG. 2 shows a source 40 of compressed air that is directed via line 42 to a pressure regulator 44 and venturi 46 which may be positioned within housing 14. Pressure regulator 44, and venturi 46 are enclosed within housing 14, which includes a slip fitting for connecting an air supply hose to the internal vacuum components. As compressed air is applied to venturi 46, a low-pressure region is developed at the neck of the venturi which includes a port that extends to a one-way valve 48 and then to the vacuum space between vacuum plate 16 and the surface. Air is then exhausted at exhaust port 56. This mechanism provides a very reliable and inexpensive source of vacuum. As an example, a "P-5 Mini Chip" venturi manufactured by PIAB (Täby, Sweden) generates about 25-26 inches (63.5-66 cm) of mercury with 0.68 cubic feet (19 liters) per minute at 55 pounds per square inch (380 KPa). Pressure regulator 44 is, for example, a miniature regulator such as those available from Wilkerson Corporation (Englewood, Colo.). Pressure regulator 44 controls the air inflow to optimize the performance of venturi 46.

In a third embodiment, an external vacuum pump is placed in communication with the vacuum space below the vacuum plate 16 via a vacuum hose and external connection. A one-way valve as described above may be integrated with adapter 10 to prevent air from leaking into the device after the vacuum is drawn.

In operation, a user places the vacuum adaptor on a non-porous sturdy surface such as a granite table, operates the pump or apply compressed air as discussed above to evacuate the vacuum space until the required vacuum is reached. Vacuum gauge 35, preferably a center back mounted gauge having a 2" diameter gauge face, may be used to determine when the proper vacuum level is achieved at which point the pump or compressed air is disengaged. The user may then attach a device 8, shown in FIG. 3, having magnet mount 5 to adapter 10 by inserting the magnetic chuck into recess 26.

While any device may be used with vacuum adapter 10, in the embodiment of FIG. 3, device 8 is a portable coordinate measurement machine that includes a base 60 having magnet mount 5 at the bottom thereof. A jointed, articulated arm 62 extends upwardly from base 60 and terminates at a measurement probe 64.

To release adapter 10, a miniature on/off ball valve (not shown) may be used. A three-way valve with the third port open to the atmosphere will release the plate when the valve is turned off, thereby placing the vacuum in communication with the atmosphere.

Another embodiment of a stable support will now be described with reference to FIGS. 4 and 5. In this embodiment, vacuum plate 16 is formed of a ferromagnetic material, preferably ferromagnetic steel, e.g., 416 stainless steel, which is one of the most magnetic steels. Thus, a separate steel plate for attaching a magnetic base is not required. A recess 26 has a flat surface therein for receiving a magnet from the object or device being supported. Vacuum plate 16 also includes a circumferential rim 72 extending around rubber seal 18 in place of the feet 22 within the seal as shown in the previous embodiment. Note that, a solid rim and/or discrete feet may be used, either within the seal or external thereof, to support the vacuum plate 16 when a vacuum is established in the vacuum space between vacuum plate 16 and the mounting surface.

Seal 18 is retained on the lower side 78 of vacuum plate 16 by a retaining means such as interlocking retention collars 74, 76 formed on the seal and vacuum plate 16, respectively. Alternatively, other interlocking structures may be used. In addition or alternatively to such interlocking structures, the upper surface of inner collar 77 is attached to lower surface 78 using a suitable adhesive (not shown).

Seal 18 includes a flexible portion 84 that extends radially from the retaining means to sealing surface 82. Flexible portion 84 allows the sealing surface 82 to become sealingly engaged with the mounting surface. Specifically, the pressure differential above and below the flexible portion 84 causes a downward pressure to be applied to sealing surface 82 sufficient to maintain a vacuum within seal 18. While flexible portion extends radially outward from retaining means to sealing surface 82, the retaining means could also be circumferentially disposed around sealing surface 82, such that the flexible portion extends radially inward from the retaining means to sealing surface 82.

A seal rim 86 projects toward and approaches the inside surface of rim 72 to improve the appearance of the underside of vacuum adapter 16 and to prevent foreign objects from entering the space above flexible portion 84.

Figure 5:
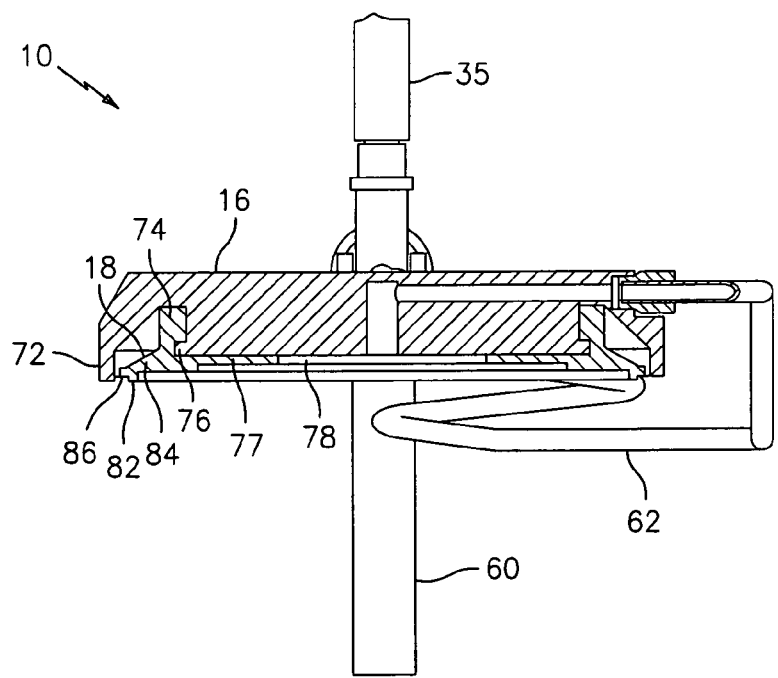
FIG. 5 shows a cross section view of the vacuum adapter of FIG. 4.

As shown in FIGS. 4 and 5, the vacuum is produced using a hand pump 60 that is external to vacuum plate 16 and connected thereto by a vacuum hose 62. An internal conduit provides fluid connection between the hose 62 and the vacuum space beneath vacuum plate 16. A quick disconnect 64 is provided between vacuum hose 62 and vacuum plate 16. Hand pump 60 includes a vacuum meter 35 and is available, for example, from TRI-ESS Sciences, part V183. In operation, vacuum hose 62 is connected to vacuum plate 16 and lever handle 66 is repeatedly operated until vacuum gauge 35 indicates the required amount of gauge pressure. Once the required amount of vacuum is achieved, and is found to be stable, i.e., not leaking, vacuum adapter 10 is ready to be utilized as a stable support. When it is required that vacuum adapter 10 be moved to a new location or removed from the support surface, a pressure release valve (not shown) on hand pump 60 is operated to relieve the vacuum thereby enabling easy removal of vacuum adapter 10.

While preferred embodiments have been shown and described, various modifications and substitutions may be made thereto without departing from the spirit and scope of the invention. For example, the one-way valve may be eliminated which would require continuously operating the vacuum source, e.g., continuously applying compressed air 40 to said venturi during use of adapter 10 thereby ensuring that the vacuum is maintained within vacuum plate 16. Many other such modifications are possible without departing from the spirit and scope of this invention. Accordingly, it is to be understood that the present invention has been described by way of illustration and not limitation.

What is claimed is:

1. A vacuum support comprising:
   a vacuum plate having a top surface and a bottom surface, said top surface receptive to releasably mounting a separate operative device therewith;
   at least two rigid stops extending from the bottom surface;
   a seal extending along a periphery of said bottom surface, said vacuum plate and said seal defining a vacuum space;
   wherein upon attaching said vacuum plate to a mounting surface by reducing pressure in said vacuum space, said at least two stops are in engagement with said mounting surface preventing any further movement of any portion of said vacuum plate toward said mounting surface, therein providing a rigid fixed distance between said bottom surface and said mounting surface;

a recess formed in the top surface of the vacuum plate, said recess being configured to contain a magnetic mount of a base of a coordinate measurement machine, and said top surface including a ferromagnetic material confgured to releasably associate said magnetic mount with the vacuum support.

2. The vacuum support of claim 1, further comprising a vacuum source in fluid communication with said vacuum space integrated with said support.

3. The vacuum support of claim 1 wherein said ferromagnetic material is a ferromagnetic plate positioned in said recess formed in the top of the vacuum plate.

4. The vacuum support of claim 1 further comprising a vacuum gauge positioned on the top surface of said vacuum plate, said vacuum gauge being in fluid communication with said vacuum space and measuring a relative pressure difference between said vacuum space and an ambient pressure.

5. The vacuum support of claim 2 wherein said vacuum source comprises a vacuum pump in fluid communication with said vacuum space for pumping air from said vacuum space thereby forming a vacuum therein.

6. The vacuum support of claim 5 wherein said vacuum pump comprises a venturi having a compressed air inlet, a vacuum port in fluid communication with a neck of said venturi, and an outlet, said vacuum support further comprising a line extending from said vacuum space to said vacuum port of said venturi.

7. The vacuum support of claim 6, said vacuum pump further comprising a pressure regulator upstream of said compressed air inlet for optimizing the operation of said venturi.

8. The vacuum support of claim 5 further comprising a one-way valve positioned between the vacuum pump and the vacuum space for preventing air from flowing into said vacuum space.

9. The vacuum support of claim 5 further comprising a release valve for relieving a pressure differential between said vacuum space and ambient pressure thus allowing said vacuum support to be removed from the mounting surface.

10. The vacuum support of claim 1 wherein said seal comprises an elastomeric material.

11. The vacuum support of claim 1 wherein the vacuum plate and the recess are formed of said ferromagnetic material.

12. The vacuum support of claim 1 wherein said vacuum source comprises a hand-operated vacuum pump.

13. The vacuum support of claim 1 wherein said at least two stops comprises three spaced feet.

14. The vacuum support of claim 13 wherein said three feet extend from said bottom surface of the vacuum support such that the seal extends around the feet.

15. The vacuum support of claim 1 wherein said bottom surface comprises a rim.

16. The vacuum support of claim 15 wherein said rim is continuous.

17. The vacuum support of claim 15 wherein said rim is disposed external to said seal and extends around said seal.

18. The vacuum support of claim 1 wherein said seal is attached to said vacuum plate using a retaining means including a flexible portion extending radially from said retaining means to a sealing surface, said sealing surface being positioned so that it becomes sealingly engaged with said mounting surface when the vacuum support is placed on said mounting surface and a vacuum is applied to a space formed by said seal and said mounting surface.

19. The vacuum support of claim 18 wherein said flexible portion extends radially outwardly from said retaining means to said sealing surface.

20. A coordinate measurement system comprising:

a vacuum support including a vacuum plate having a top surface and a bottom surface, at least two rigid stops extending from the bottom surface, and a seal extending along a periphery of said bottom surface, said vacuum plate and said seal defining a single vacuum space, wherein upon attaching said vacuum plate to a mounting surface by reducing pressure in said vacuum space, said at least two stops are in engagement with said mounting surface preventing any further movement of any portion of said vacuum plate toward said mounting surface, therein providing a rigid fixed distance between said bottom surface and said mounting surface, and rigidly supporting said coordinate measurement system relative to said mounting surface; and a operative portable coordinate measurement machine including a base having a magnet mount, an articulable arm extending from said base, and a measurement probe disposed at an end of said arm opposite said base, wherein said top surface of said vacuum plate is receptive to releasably mounting said magnet mount.

* * * * *